United States Patent
Boban et al.

(10) Patent No.: US 10,440,666 B2
(45) Date of Patent: Oct. 8, 2019

(54) MANAGING COMMUNICATION BETWEEN A PLURALITY OF MOVING OBJECTS THROUGH CONTROL OF TRANSMIT POWER AND/OR TRANSMIT RATE

(71) Applicant: NEC Europe Ltd., Heidelberg (DE)

(72) Inventors: Mate Boban, Munich (DE); Bengi Ayguen, Eskisehir (TR)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 15/527,712

(22) PCT Filed: Nov. 20, 2015

(86) PCT No.: PCT/EP2015/077266
§ 371 (c)(1),
(2) Date: May 18, 2017

(87) PCT Pub. No.: WO2016/079320
PCT Pub. Date: May 26, 2016

(65) Prior Publication Data
US 2018/0359713 A1    Dec. 13, 2018

(30) Foreign Application Priority Data
Nov. 20, 2014    (EP) .................................... 14194033

(51) Int. Cl.
*H04W 4/46*    (2018.01)
*H04W 28/22*    (2009.01)
(Continued)

(52) U.S. Cl.
CPC ........... *H04W 52/383* (2013.01); *H04W 4/46* (2018.02); *H04W 28/22* (2013.01);
(Continued)

(58) Field of Classification Search
CPC ............. H04W 52/242; H04W 52/267; H04W 52/343; H04W 52/383; H04W 84/18;
(Continued)

(56) References Cited

U.S. PATENT DOCUMENTS

2010/0312432 A1    12/2010 Hamada et al.

FOREIGN PATENT DOCUMENTS

| | | |
|---|---|---|
| JP | 2012070452 A | 4/2012 |
| WO | WO 2009107297 A1 | 9/2009 |
| WO | WO 2014048486 A1 | 4/2014 |

OTHER PUBLICATIONS

Xia Shen et al: "Distributed Congestion Control Approaches for the IEEE 802.11p Vehicular Networks", IEEE Intelligent Transportation Systems Magazine, vol. 5, No. 4, Oct. 25, 2013 (Oct. 25, 2013), pp. 50-61, XP002754239.

(Continued)

*Primary Examiner* — Philip Sobutka
(74) *Attorney, Agent, or Firm* — Leydig, Voit & Mayer, Ltd.

(57) ABSTRACT

A method for managing communication between a plurality of moving objects, wherein one or more communication channels are used for the communication, wherein each moving object is operable to adjust a transmit power level for transmitting information via the one or more communication channels, and wherein each moving object is operable to adjust a transmit rate for sending information via the one or more communication channels, includes performing, for each of the plurality of moving objects: a) adjusting the transmit power level of each moving object independently of other moving objects such that a target cooperative awareness ratio is achieved, and b) adapting the transmit rate at (Continued)

each moving object independently such that a channel load of a respective communication channel is within a predefined load interval.

28 Claims, 6 Drawing Sheets

(51) Int. Cl.
    *H04W 64/00* (2009.01)
    *H04W 52/38* (2009.01)
    *H04W 52/24* (2009.01)
    *H04W 52/26* (2009.01)
    *H04W 52/34* (2009.01)

(52) U.S. Cl.
    CPC ....... *H04W 52/242* (2013.01); *H04W 52/267* (2013.01); *H04W 52/343* (2013.01); *H04W 64/00* (2013.01)

(58) Field of Classification Search
    CPC ..... H04W 64/00; H04W 84/12; H04W 4/023; H04W 4/46; H04W 4/22; H04W 4/44; H04W 72/121; H04W 28/0284; H04W 40/20; H04W 40/244; H04W 40/246; H04W 4/046; H04W 4/40

See application file for complete search history.

(56) References Cited

OTHER PUBLICATIONS

Miguel Sepulcre et al: "Congestion and Awareness Control in Cooperative Vehicular Systems", Proceedings of the IEEE, vol. 99, No. 7, Jul. 1, 2011 (Jul. 1, 2011), pp. 1260-1279, XP011367584.
ETSI: "Intelligent Transport Systems (ITS); Decentralized Congestion Control Mechanisms for the Intelligent Transport Systems operating in the 5GHz range; Access layer part", ETSI TS 102687 V1.1.1 (20117) Technical Specification, Jul. 1, 2011 (Jul. 1, 2011), XP002754240.
Robert Wilson, et al., "Channel Identification: Secret Sharing Using Reciprocity in Ultrawideband Channels", IEEE Transactions on Information Forensics and Security, vol. 2, No. 3, Sep., 2007, pp. 364-375.
M. Petermann, "Reciprocity in Wireless Communication Systems", Reciprocity in Wireless Communication Systems — Department of Communications Engineering, Jul. 20, 2012, pp. 1-2.

Fig. 1

| Stage | CBR vs target | Awareness vs target | Rate vs target | Output at the timestep t+1 |
|---|---|---|---|---|
| 1 | < | < | == | Increase Tx Pwr (if already not max) |
| 2 | > | < | == | Reduce rate |
| 3 | < | >= | == | Do not change |
| 4 | > | >= | == | Alternate reducing rate and power |
| 5 | < | < | < | Alternate increasing rate and power |
| 6 | > | < | < | Alternate reducing rate and power |
| 7 | < | >= | < | Increase rate |
| 8 | > | >= | < | Alternate reducing rate and power |

Algorithm 1 Environment-Aware Combined Power and Rate Control for Vehicular Communication (ECPR) algorithm i'th neighbor's distance $d_i(t)$, target awareness range $r_e(t)$ [30,180], Beacon rate $BR$, Neighbor's Tx Power $P_{n_i}^{Tx}$, Capacity of channel = C, a = 0.1, b = 1/150, Power of small scale fading $P_{ssf}$, Received power of a message $P_{mes}^{Rx}$, Carrier sense threshold $CS_{Th}$, Target CBR $CBR_{Tar}$;

Time Step = t
1: $P_{message}^{Rx} = P_{n_i}^{Rx} + P_{ssf}$
2: $CBR(t) = \sum_i (P_{mes}^{Rx} > CS_{Th})/C$
3: $BR(t+1) = (1-a)BR(t) + b(CBR_{Tar} - CBR(t))$
4: $PL_i(t) = P_{n_i}^{Tx}(t) - P_{n_i}^{Rx}(t)$
5: $PLE_i(t) = \frac{PL_i(t) - PL_i(t_0)}{10\log_{10}(d_i(t))}$
6: $P_{e \to n_i}^{Tx}(t+1) = P_{n_i}^{Rx}(t) + 10PLE_i(t)\log_{10}(r_e(t))$

Time Step = t+1
7: if Neighbor(t+1) = Neighbor((t) then
8:    Check Decision Table according to the current beacon rate, CBR, NAR
9:    if Current Stage = Stage 1 then
10:       $P_{e \to n_i}^{Tx}(t) \leftarrow P_{e \to n_i}^{Tx}(t+1)$
11:    else
12:       if Current Stage = Stage 2 || Stage 3 || Stage 7 then
13:          Do not change next Tx Power
14:       else
15:          if Current Stage = Stage 4 || Stage 5 || Stage 6 || Stage 8 then
16:             if $(BR(t) - BR(t)_{Ta}) > 10(NAR(t) - NAR_{Ta})$ then
17:                Do not change next Tx Power
18:             else
19:                $P_{e \to n_i}^{Tx}(t) \leftarrow P_{e \to n_i}^{Tx}(t+1)$
20: else
21:    $P_{e \to n_i}^{Tx}(t+1) \leftarrow 23dBm$
22:    $BR(t+1) \leftarrow 10Hz$

MANAGING COMMUNICATION BETWEEN A PLURALITY OF MOVING OBJECTS THROUGH CONTROL OF TRANSMIT POWER AND/OR TRANSMIT RATE

CROSS REFERENCE TO RELATED APPLICATIONS

This application is a U.S. National Stage Application under 35 U.S.C. § 371 of International Application No. PCT/EP2015/077266 filed on Nov. 20, 2015, and claims benefit to European Patent Application No. 14194033.8 filed on Nov. 20, 2014. The International Application was published in English on May 26, 2016 as WO 2016/079320 A1 under PCT Article 21(2). European Patent Application EP 14 194 033.8 is incorporated by reference herein.

FIELD

The present invention relates to a method for managing communication between a plurality of moving objects, e.g. vehicles.

The present invention further relates to a system for managing communication between a plurality of moving objects, e.g. vehicles.

The present invention even further relates to a method for managing communication of a moving object performed by said moving object.

The present invention even further relates to a non-transitory computer readable medium storing a program causing a computer to execute a method for managing communication between a plurality of moving objects, e.g., vehicles.

BACKGROUND

The increasing demand for connectivity and broadband wireless access between vehicles, as well as with roadside infrastructure, has led to the concept of vehicular ad hoc networks. These so-called VANETs have been receiving a growing amount of attention over the past decade. One of the most vital applications on intelligent transportation is the vehicles being aware of each other on the intersections by exchanging information on VANETs. Therefore, the possibility of crash on intersections decreased. Another example is collision avoidance provided by VANETs on a highway: When there is a traffic accident or traffic jam on a part of road, this information is exchanged and the vehicles that have a chance to change their ways are informed. On the other hand, comfort applications include Internet connectivity, ultra-wide band communication system, etc., Infotainment and peer-to-peer accesses are the members of this kind of VANET applications.

Although there has been substantial research efforts being conducted on VANETs, there are still several significant technical challenges that need to be addressed, including the following:

The network topology and link conditions are time-varying since the distances between vehicular nodes can potentially change over distance and time.

Connecting the ego vehicle to the neighbor vehicles which is needed for safety purposes but hard to reach because of obstacles, intersections, foliage, etc.

Increasing the awareness by using limited power and rate resources.

Dealing with any type of environment characteristics such as urban, suburban and rural areas. For example, the speeds of vehicles are low and the effect of obstacles, scatterers and reflections are higher in urban area. Meanwhile, speeds are high and there are less obstacles around the road in highway scenario.

Cooperative inter-vehicular applications usually rely on the exchange of broadcast single-hop status messages among vehicles on a single control channel, which provide detailed information about vehicles position, speed, heading, acceleration, and other data of interest. These messages are called beacons and are transmitted periodically, at a fixed or variable beaconing rate. The aggregated load on a wireless channel due to periodic beacons can rise to a point where it can limit or prevent the transmission of other types of messages: this is called channel congestion due to beaconing activity. To prevent this situation control scheme can be provided, e. g. the beaconing rate of each vehicle.

For example in the non patent literature of G. Bansal, K. Rohrs, J. B., and C. E., "Limeric: A linear adaptive message rate algorithm for dsrc congestion control," IEEE Transactions on Vehicular Technology, vol. 62, no. 9, pp. 4182-4197, November 2013, the next beacon rate as transmission rate is adapted by using the current channel busy ratio feedback. As a result of an iteration the beacon rate converges to a single fixed value.

Other rate adaption procedures are for example disclosed in the non-patent literature of K. Ogura, J. Katto, and M. Takai, "Braeve: Stable and adaptive bsm rate control over ieee802.11p vehicular networks," in IEEE Consumer Communications and Networking Conference (CCNC). New York: IEEE, 2013, pp. 745-748 and in the non-patent literature of T. Tielert, D. Jiang, Q. Chen, L. Delgrossi, and H. Hartenstein, "Design methodology and evaluation of rate adaptation based congestion control for vehicle safety communications," in IEEE Vehicular Networking Conference (VNC). New York: IEEE, 2011, pp. 116-123.

Power adaption procedures are for example disclosed in the non-patent literature of G. Caizzone, P. Giacomazzi, L. Musumeci, and G. Verticale, "A power control algorithm with high channel availability for vehicular ad hoc networks." New York: IEEE, 2005, pp. 3171-3176 in which the transmit power is adapted depending on the number of neighbors. The transmit power is increased in case of a number of neighbors is under a threshold or vice versa. However, this is only suitable for a limitless channel capacity. A further problem here is that any changing environment conditions cannot be taken into account.

In the non-patent literature of L. L., R. Baldessari, P. Salvador, A. Festag, and Z. Wenhui, "Performance Evaluation of Beacon Congestion Control Algorithms for VANETs," in IEEE Global Telecommunications Conference (GLOBECOM 2011), December 2011, pp. 1-6 a combined power and rate adaption procedure is shown using a relationship between transmit power and the transmit rate with equal share of resources. However, the same bandwidth is allocated although the desired beacon rates of each ego node may be different depending on speed and distance of vehicles.

SUMMARY

In an embodiment, the present invention provides a method for managing communication between a plurality of moving objects, wherein one or more communication channels are used for the communication, wherein each moving object is operable to adjust a transmit power level thereof for transmitting information via the one or more communication channels, and wherein each moving object is operable to adjust a transmit rate thereof for sending information via the one or more communication channels. The method includes performing, for each of the plurality of moving objects, the following steps: a) adjusting the transmit power level of each moving object independently of other moving objects such that a target cooperative awareness ratio is achieved, and b) adapting the transmit rate at each moving object independently such that a channel load of a respective communication channel is within a predefined load interval.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable to various kinds of application using communication between moving objects, embodiments of the present invention will be described with regard to safety and efficiency applications.

Although applicable to various kinds of information to be sent and received, embodiments of the present invention will be described with regard to cooperative awareness messages to be exchanged between vehicles.

Also applicable to various kinds of moving object, embodiments of the present invention will be described with regard to vehicle intelligent transport system stations, 'ITS-S', like vehicles, e.g. cars or the like.

Additionally to the challenges mentioned above, various embodiments of the present invention can address the problems of an easy implementation and a fast adaption to variations in the communication and the set of moving objects in range.

In an embodiment, the present invention provides a method for managing communication like exchanging cooperative awareness messages, 'CAM', between a plurality of moving objects like vehicles, wherein for communication one or more communication channels are used, wherein each moving object is operable to adjust its transmit power level for transmitting information via said one or more channels, wherein each moving object is operable to adjust its transmit rate for sending information via said one or more channels, comprising the steps, performed for each of said moving objects, of a) Adjusting said transmit power level of each moving object independently of other moving objects such that a target cooperative awareness ratio is achieved, and b) Adapting the transmit rate at each moving object independently such that a channel load of a respective communication channel is within a predefined load interval.

In a further embodiment, the present invention provides a system for managing communication like exchanging cooperative awareness messages, 'CAM', between a plurality of moving objects like vehicles, wherein for communication one or more communication channels are used, wherein each moving object is operable to adjust its transmit power level for transmitting information via said one or more channels, wherein each moving object is operable to adjust its transmit rate for sending information via said one or more channels, and wherein at least one of said moving objects is operable to:

a) Adjusting said transmit power level of each moving object independently of other moving objects such that a target cooperative awareness ratio is achieved, b) Adapting the transmit rate at each moving object independently such that a channel load of a respective communication channel is within a predefined load interval.

In a further embodiment, the present invention provides a method for managing communication like exchanging cooperative awareness messages, 'CAM', of a moving object like a vehicle, performed by said moving object, said moving object being adapted to use for communication one or more communication channels, adjust its transmit power level for transmitting information via said one or more communication channels, adjust its transmit rate for sending information via said one or more communication channels, and to:

a) Adjust its transmit power level such that a target cooperative awareness ratio is achieved, and b) Adapt the transmit rate such that a channel load of a respective communication channel is within a predefined load interval.

In a further embodiment the present invention provides a non-transitory computer readable medium storing a program causing a computer to execute a method for managing communication like exchanging cooperative awareness messages, 'CAM', between a plurality of moving objects like vehicles, wherein for communication one or more communication channels are used, wherein each moving object is operable to adjust its transmit power level for transmitting information via said one or more channels, each moving object is operable to adjust its transmit rate for sending information via said one or more channels, comprising the steps, performed for each of said moving objects, of:

a) Adjusting said transmit power level of each moving object independently of other moving objects such that a target cooperative awareness ratio is achieved, and b) Adapting the transmit rate at each moving object independently such that a channel load of a respective communication channel is within a predefined load interval.

In a further embodiment, the present invention provides a combined rate and power distributed congestion control, 'DCC', method, performed by one or more vehicles, wherein cooperative awareness messages, 'CAM', are exchanged for information of neighbor vehicles about vehicle positions and/or movements, and wherein cooperative awareness is improved by adapting to propagation environments of a vehicle and application requirements of applications of said vehicle.

In a further embodiment, the present invention provides a system for combined rate and power distributed congestion control, 'DCC', comprising a plurality of vehicles, said vehicles each comprising a sender for sending cooperative awareness messages, 'CAM', and a receiver for receiving CAM from neighbor vehicles, said CAM including information about vehicle positions and/or movements, and wherein cooperative awareness is improved by adapting to propagation environments of a vehicle and/or application requirements of applications of said vehicle.

In a further embodiment, the present invention provides a non-transitory computer readable medium storing a program causing a computer to execute a combined rate and power distributed congestion control, 'DCC', method, performable by one or more vehicles, wherein cooperative awareness messages, 'CAM', are exchanged for information of neighbor vehicles about vehicle positions and/or movements, and wherein cooperative awareness is improved by adapting to propagation environments of a vehicle and application requirements of applications of said vehicle.

At least one of the embodiments has at least one of the following advantages: improved channel utilization for a given awareness rate or improved cooperative awareness for a given channel utilization, flexibility in terms of usage of different means to adjust power for desired awareness, increased a rate in good propagation environments compared to state of the art, easy implementation since no centralize infrastructure is needed, fast adaption to variations in channel properties and in the set of moving objects in range.

The term "moving object" can be understood in its broadest sense and refers preferably in the description, especially in the claims, to any kind of object which can move like vehicle intelligent transport system stations, e.g. cars, trucks, planes, busses, bicycles, drones or the like.

The terms "computing device", "computer" or "computing entity", etc. refer in particular in the claims, preferably in the description to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices, computers or computing entities may be adapted in such a way that the corresponding steps to be computed are performed in an optimized way. For instance, different steps may be performed in parallel with a single processor on different of its cores.

The term "computer readable medium" may refer to any kind of medium, which can be used together with a computation device, entity or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

Methods according to embodiments of the present invention may be performed in one or more memories available to computing devices, e.g. processors.

Information about said transmit power level may be inserted into information to be transmitted by a moving object and used for determining said channel load by said moving object. For instance by inserting a transmit power value in some of the transmitted packets and by using the channel reciprocity theorem it is possible to estimate the power of each of the receiving moving objects. The transmit power level is then adjusted based on the power required to reach a certain percentage of neighboring moving objects. Said percentage value may be determined according to application requirements.

Environment communication information determined by moving objects may be used for determining said channel information. Environment communication information may for example the so-called propagation map information indicating information about the propagation properties of other moving objects within the certain distance around an ego moving object. This enables in a flexible way to determine said channel information more precisely.

Topological neighbourhood information and/or short term channel load from neighboring moving objects may be used for determining said channel load. This enables in an alternative way to determine said channel information precisely. Topological neighborhood information include for example the number of directly reachable neighbor moving objects.

Steps a)-b) may be performed periodically. This enables to provide continuously an efficient use of the communication channels and an adaption of the corresponding transmit powers. Changing environment conditions can thus be handled in a flexible way.

In each time period it may be determined if and how to adjust said transmit power level. This enables an efficient adaption to changing conditions due to the movement of the moving objects, channel load or the like, e.g. transmit power is only adjusted if needed. Thus unnecessary computation of a new transmit power value is avoided and computational resources are saved.

Said transmit rate may be computed based on at least one of: channel busy ratio, cooperative awareness ratio, transmit rate. For example the channel load can be determined based on the channel business ratio—CBR—which is defined as the proportion of the total channel time that is sensed as busy. This enables an enhanced flexibility when computing the transmit rate while being precise.

Steps a) and b) may be performed for different groups of moving objects. This enhances the flexibility while saving computational resources: For instance rate adaption is performed for all moving objects while power adaption is performed only on a selected number of moving objects or vice versa.

The transmit power level may be adjusted based on a path loss exponent estimation. Computing the path loss exponent provides in a precise and reliable way an indication how to adapt the transmit power.

Only a number and/or percentage of neighboring moving objects may be considered for performing steps a) to b). This enhances the flexibility and a fast adaptation of the transmit rate and/or transmit power since for example when performing the steps a) to b) periodically only the transmit power and/or the transmit rate for a certain number of moving objects has to be adapted.

Computing said transmit power may be based on a target awareness distance. This enables to include only those moving objects within a certain distance of an ego moving object. The value of the target awareness distance may depend on the type of application which uses communication of the moving object.

Said target awareness distance may be computed based on a function of current neighbor moving objects of a moving object. This enables in a more adaptive way and takes into account different moving object scenarios. Thus flexibility is enhanced.

Current context the moving object operates in may be used for performing steps a) and b). That may result in a more precise adaption of the transmit power level and/or the transmit rate.

Steps a) and b) may be performed such as to adapt to propagation environments and/or application environments. That may result in an even more precise adaption of the transmit power level and/or the transmit rate.

Said context may include at least one of: speed, direction, application requirement of a moving object. That may result in an even more precise adaption of the transmit power level and/or the transmit rate with a minimum of information to be exchanged. Thus computational resources are saved.

For adjusting the transmit rate an adaptive rate control procedure like LIMERIC may be used. This enables to adapt the next transmit rate using a current channel business ratio.

The transmit power level of CAM may adjusted based on current vehicle operating context. That may result in a more precise adaption of the transmit power level and/or the transmit rate.

At the same time the channel load of the channel used by said CAM may be controlled by an adaptive rate control procedure. This enables a fast and flexible adaption of the transmit rate.

Said adaptive rate control procedure may be based on LIMERIC. This enables a reliable adaption.

Cooperative awareness may be evaluated based on at least one of Neighborhood Awareness Ratio, 'NAR', Ratio of Neighbors Above Range, RNAR'. This enables a reliable determination of cooperative awareness while being flexible. NAR may defined as the proportion of vehicle Intelligent transport system stations, 'ITS-S', in a specific range from which a message was received in a defined time interval. This enables to measure the ability of cooperative message exchange to fulfill cooperative awareness. RNAR may be defined as ratio of neighbors that are above a certain distance from the observed moving object, e.g. a vehicle. This enables to provide an indication of potentially unnecessary traffic overheard from distant neighbors.

Cooperative awareness may be evaluated based on the performance of distributed congestion control. This provides an even more precise adaption of rates.

Said performance of distributed congestion control, 'DCC', may be determined by at least one of Average Message Rate, Average Tx Power, Channel Busy Ratio, 'CBR'. Said Average Message Rate may be defined as the number of messages that a vehicle ITS-S can transmit per second, averaged over all vehicle ITS-S for a given second. Said Average Tx Power may be defined as the average transmit power level at which a vehicle ITS-S transmits, averaged over all messages for a given second. Said CBR may be defined as the proportion of channel time, where the energy measured on the channel is above the clear channel assessment, 'CCA', threshold. This enables a precise determination of the DCC performance.

There are several ways how to design and further develop the teaching of the present invention in an advantageous way. To this end it is to be referred to the patent claims subordinate to the independent patent claims on the one hand and to the following explanation of further embodiments of the invention by way of example, illustrated by the figure on the other hand. In connection with the explanation of the further embodiments of the invention by the aid of the figure, generally embodiments and further developments of the teaching will be explained.

Figure 1:
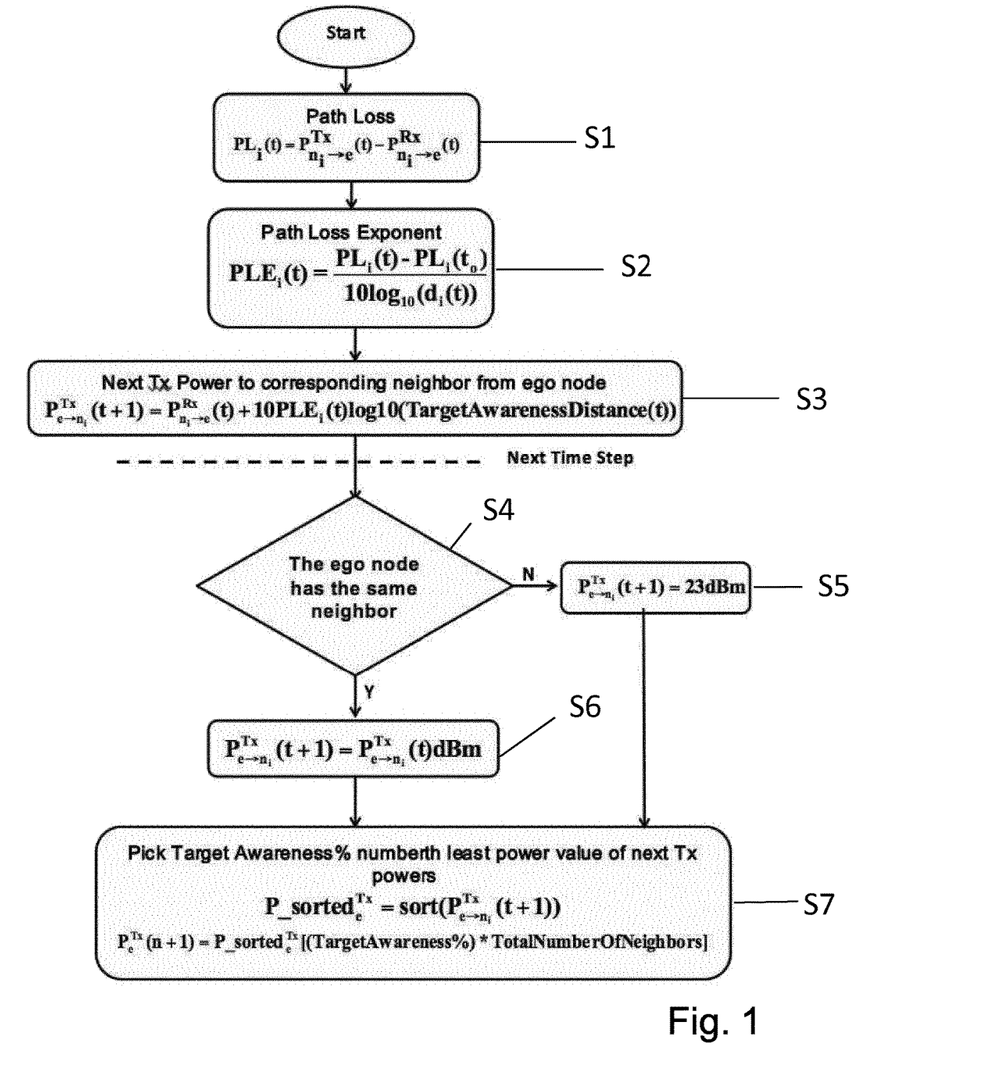
FIG. 1 shows steps of a method according to an embodiment of the present invention.

FIG. 1 shows part of steps of a method according to an embodiment of the present invention.

In FIG. 1 a flow chart for adapting the transmit power is shown. The shown power adaptation procedure uses a maximum beacon rate, i.e. 10 Hz, for all communication pairs, and adapts the transmit power based on current Path Loss Exponent, "PLE", and target awareness distance which an operator sets as an input. The value of target awareness distance may be dependent on the type of application for which communication is used. For instance, emergency and brake control applications need to be aware of 50-100 m range while traffic and road control messages may need to be sent to further away. Similarly, target awareness that desired to be achieved may be used as an input of the power adaption procedure. Once next transmit power of ego moving object for each neighbor moving object is computed by using current PLE and target awareness distance, the transmit power value which lets the ego moving object be aware of the target awareness percentage of neighbor is picked to be used by ego moving object.

The transmit power adaptation procedure, which is shown at the flowchart in FIG. 1, is described in detail below:

Given ego moving object transmit power at time t: $P_e^{T_x}(t)$, i-th neighbor's moving object transmit power at time t: $P_{n_i}^{T_x}(t)$ where i=N Go through neighbor moving object table, get neighbor moving object distances where neighbor moving object distances vector at time t is D(t)

Compute $PLE_i(t)$ by using log normal path loss as below (steps S1 and S2)

$$PLE_i(t) = \frac{PL_i(t) - PL_i(t_0)}{10 \log_{10}(d_i(t))},$$

where $d_i(t)$ is the neighbor moving object current distance, $PL_i(t)$ is the path loss on corresponding channel by subtracting reception power from transmit power of the corresponding neighbor moving object.

$PL_i(t) = P_{n_i}^{T_x}(t) - P_{n_i}^{R_x}(t)$.

Calculate in step S3 ego's moving object transmit power to the corresponding neighbor moving object for next time step, $P_e^{T_x}(t+1)$, using $PLE_i(t)$ as:

$P_{e \to n_i}^{T_x}(t+1) = P_{n_i}^{R_x}(t) + 10 PLE_i(t) \log_{10}(r_e(t))$ where $r_e(t)$ is the target awareness distance.

Check in step S4 the connection with this specific neighbor moving object in the next time step. If it goes on, use in step S5 the transmit power value that the procedure proposes, else use the maximum possible transmit power in step S5.

Pick in step S7 the ego moving object's transmit power to all neighbor moving objects at the next time step by considering the target awareness percentage, i.e. covering the target awareness percentage of total number of neighbor objects.

$P\_sorted_e^{T_x} sort(P_{e \to n_i}^{T_x}(t+1))$ $P_e^{T_x}(t+1) = P\_sorted_e^{T_x}[(\text{Target Awareness \%})*(\text{Total number of neighbors})]$ To obtain more adaptive procedure to neighbor moving object's distance, the target awareness distance can be used as a function of the current neighbors' moving objects distances by computing as mean(D(t))−std(D(t)) where D(t) is the vector of neighbor distances.

Figure 2:
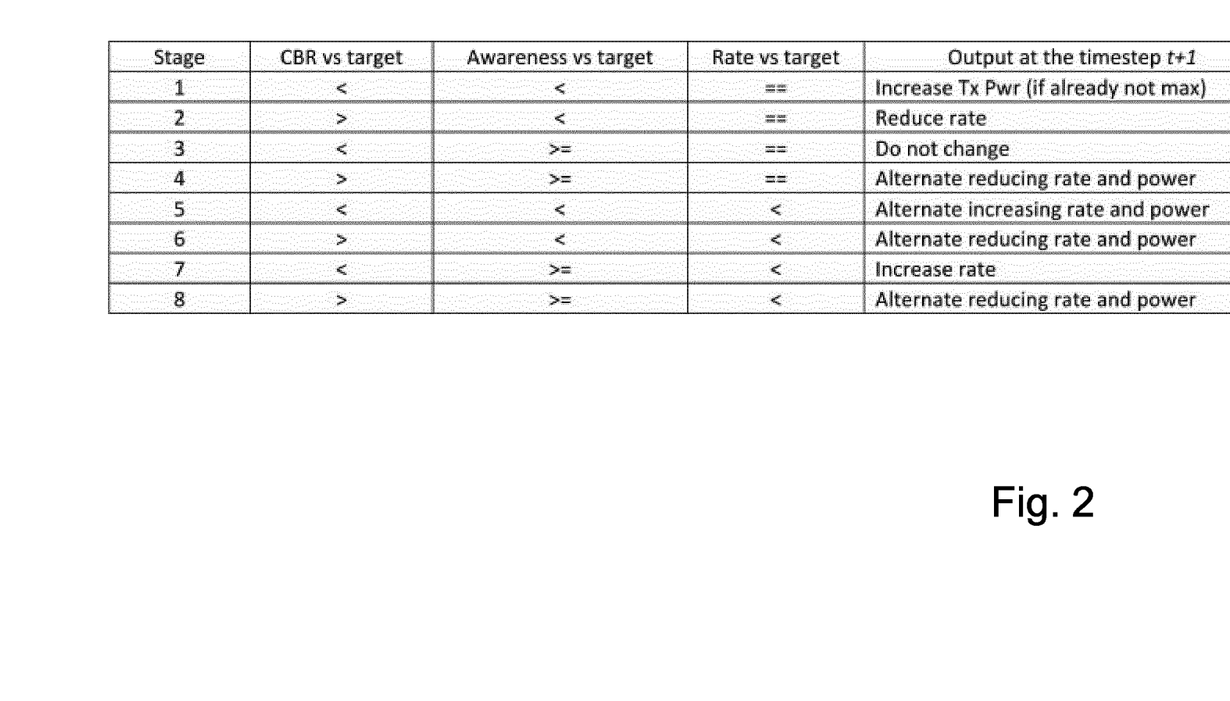
FIG. 2 shows part of a method according to a further embodiment of the present invention.

FIG. 2 shows part of a method according to a further embodiment of the present invention.

In FIG. 2 a decision table for adaption behavior is shown. For example if the channel busy ratio is smaller than the channel busy ratio target and the awareness is below the awareness target and the rate in general is equal to the rate target then the transmit power is increased in the next time step if it is not already at maximum. Another example is enabled with the stage 5: If the channel business ratio, the awareness value and transmit rate is below the corresponding target value then alternate rate and power increase is performed for the next time step.

In an embodiment rate adaption is performed for all nodes/moving objects whereas power adaption is performed to selected nodes/moving objects only. In a further embodiment an additive increase and multiplicative decrease AIMD, i. e. an increase by 1 dBm or decrease by 2 dBm may be performed.

|  | Rate Adaptation | Power Adaptation |
|---|---|---|
| Scenario 1 | to all nodes | AIMD to all nodes |
| Scenario 2 | to selected nodes | AIMD to all nodes |
| Scenario 3 | to all nodes | PLE computation to all nodes |
| Scenario 4 | to selected nodes | PLE computation to all nodes |
| Scenario 5 | to all nodes | PLE computation to selected nodes |
| Scenario 6 | to selected nodes | PLE computation to selected nodes |

Figure 3:
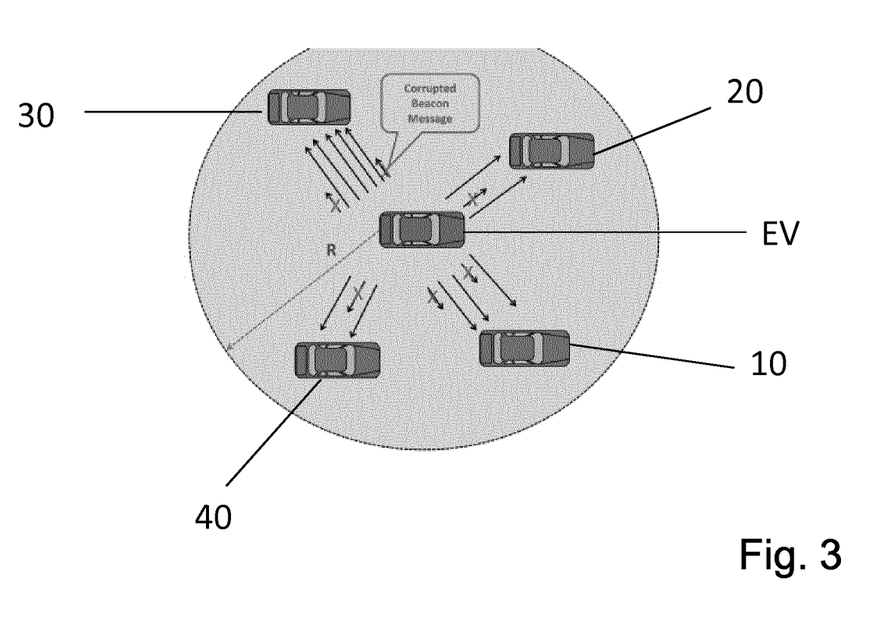
FIG. 3 shows a system according to a further embodiment of the present invention.

FIG. 3 shows a system according to a further embodiment of the present invention.

In FIG. 3 a message based network awareness rate, 'NAR', scenario is shown. NAR is defined for a specific communication range as the number of vehicles 10, 20, 30, 40 that ego moving object EV can hear divided by the number of all moving objects 10, 20, 30, 40. Message based NAR is number of total control messages that successfully received divided by total number of total control messages that has been sent in a specific communication range as shown in FIG. 3.

This message-based network awareness rate is used in an embodiment to be a basis for cooperative awareness. If the cooperative awareness should be increased then the network awareness rate could also be increased.

Figure 4:
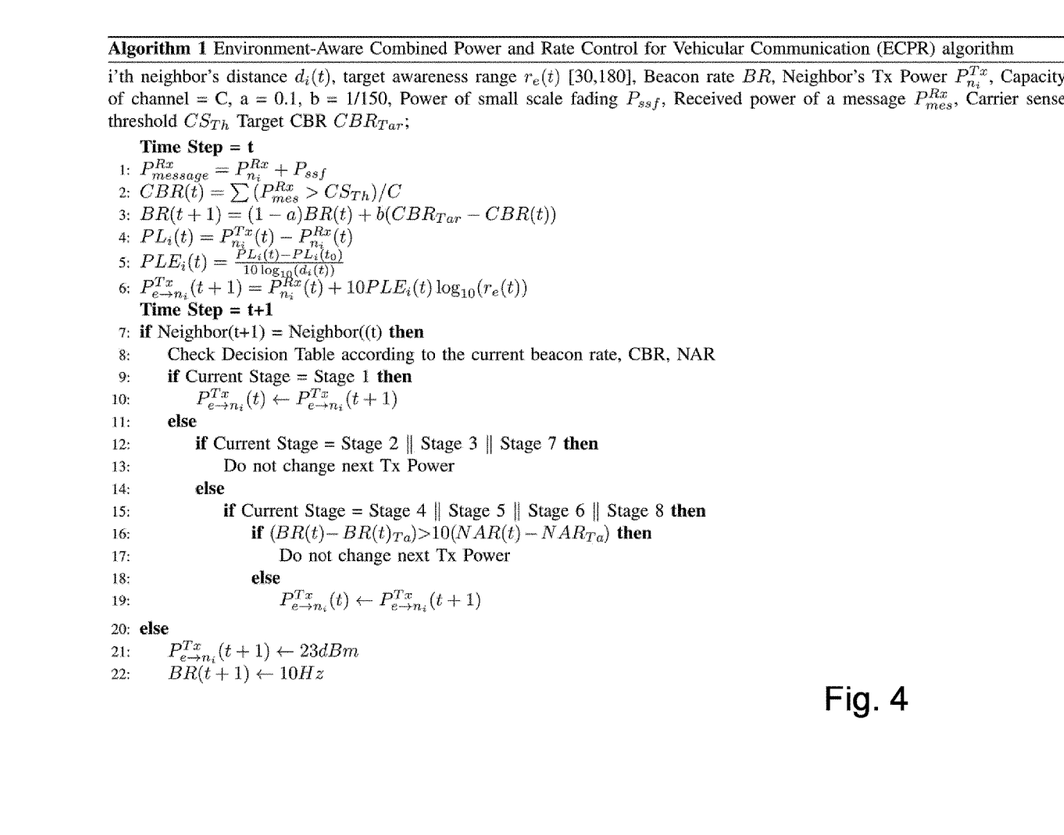
FIG. 4 shows part of an implementation of a method according to an embodiment of the present invention.

FIG. 4 shows a part of an implementation of a method according to an embodiment of the present invention.

FIG. 4 shows a so-called environment-aware combined power and rate control procedure for vehicular communication: The maximum transmit to power is set to 23 dBm and the maximum beacon rate is that to 10 Hz. The target awareness is set to 85% in target distances.

Figure 5:
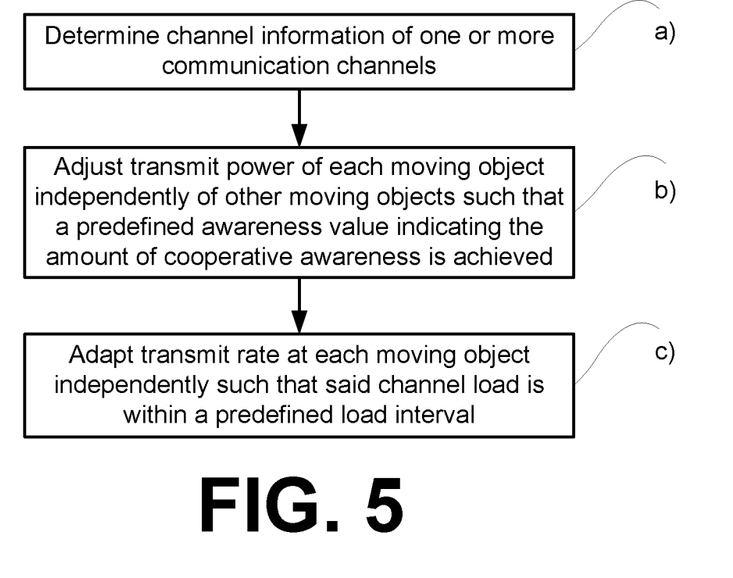
FIG. 5 shows steps of a method according to a further embodiment of the present invention.

FIG. 5 shows steps of a method according to a further embodiment of the present invention.

In FIG. 5 a method for managing communication between the plurality of moving objects like vehicles is shown, wherein for communication one or more communication channels are used, each moving object is operable to adjust its transmit power for transmitting information via said one or more channels, each moving object is operable to adjust its transmit rate for sending information via said one or more channels, comprising the steps, performed for each of said moving objects, of
a) Determining channel information of said one or more communication channels,
b) Adjusting said transmit power of each moving object independently of other moving objects such that a predefined awareness value indicating the amount of cooperative awareness is achieved,
c) Adapting the transmit rate at each moving object independently such that said channel load is within a predefined load interval.

Figure 6:
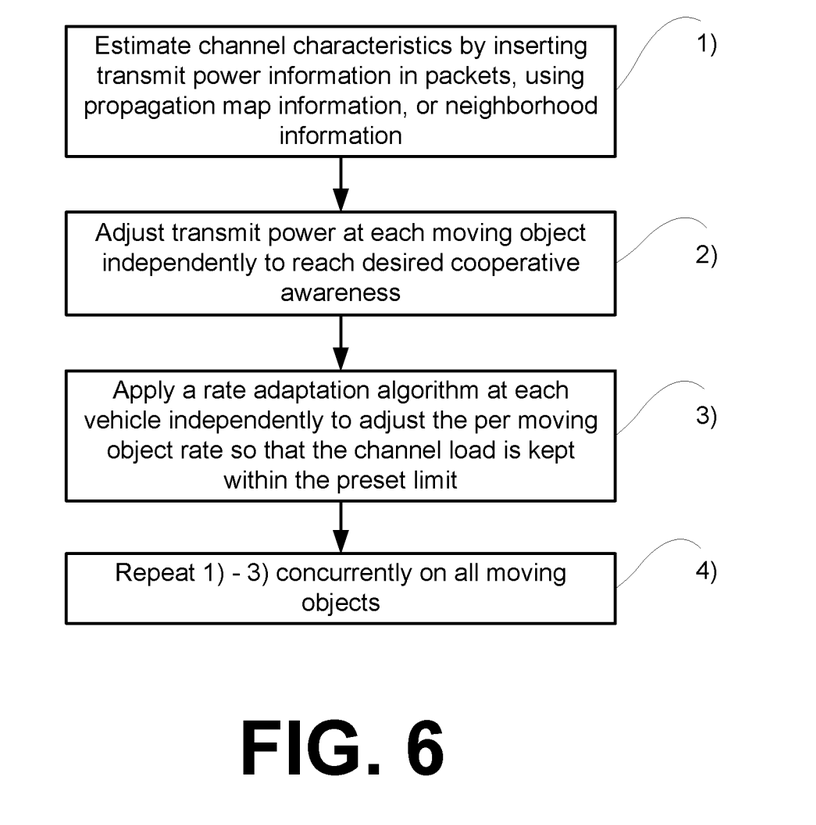
FIG. 6 shows steps of a method according to a further embodiment of the present invention.

FIG. 6 shows steps of a method according to a further embodiment of the present invention.

In FIG. 6 a method for combined control of the power and rate in vehicular network is shown, which comprises the following steps:
1) Estimating the channel characteristics by either inserting transmit power information in packets, using propagation map information, or neighborhood information.
2) Adjusting the transmit power—at each moving object independently—to reach desired cooperative awareness.
3) Applying a rate adaptation algorithm at each vehicle independently—to adjust the per moving object rate so that the channel load is kept within the preset limit.
4) Repeating above steps concurrently on all moving objects.

In summary embodiments of the present invention enable a control mechanism deciding on a vehicle's beacon rate, wherein each vehicle exchanges signaling information with their neighbor vehicles without relying on any centralized infrastructure. Embodiments of the present invention further enable to permit a fast adaptation to variations in the channel properties (due to tunnels, street crosses etc.), and in the set of moving objects in range (due to arbitrary movement of the moving objects).

Embodiments of the present invention provide an environment- and context aware Combined Power and rate distributed congestion control, 'ECPR'. Said ECPR enables to combine power and rate control to improve cooperative awareness by adapting to both specific environments, such as urban intersections, open highways, suburban roads, and/or application requirements like different target cooperative awareness range. ECPR adjusts the transmit power level of the CAM to reach the desired awareness ratio at the target distance while preferably at the same time controlling the channel load via an adaptive rate control procedure, e.g. based on LIMERIC. LIMERIC is for example disclosed in the non-patent-literature of G. Bansal, K. Rohrs, J. B., and C. E., "Limeric: A linear adaptive message rate algorithm for dsrc congestion control," IEEE Transactions on Vehicular Technology, vol. 62, no. 9, pp. 4182-4197, November 2013.

Embodiments of the present invention enable a combined power and rate control procedure addressing channel congestion by increasing the proportion of informed neighbors within a given range (based on the requirements of the application running at ego moving objects) through congestion control by using the cooperative awareness as a metric to optimize the transmit power of each communicating moving object.

Characteristics or parameters of cooperative awareness can be estimated using at least one of the following:
  Inserting the transmit power value information in (some of) transmitted packets and using the channel reciprocity theorem to estimate the power at each of the receiving moving objects; selecting the transmit power based on the power required to reach the X-th percentile of the neighboring moving objects (where X is the determined using the application requirements).
  Using the "propagation map" information: information about the propagation characteristics of the surroundings around the ego moving object.

Using the topological neighborhood information (number of directly reachable neighbor moving objects) and the short-term load experienced from each of the neighbor moving objects.

The transmit rate control can then used to utilize the available channel resources (i.e., achieve as high rate per moving object as possible), subject to at least one of the following conditions:

Combined load on the channel, which can be estimated by the ego moving object locally or using measurements from 1-hop and 2-hop neighborhood, is kept below a prescribed value. An exemplary channel load metric is Channel Busy Ratio (CBR) defined as the proportion of the total channel time that is sensed as busy.

Per-vehicle rate might need to be kept within predefined boundaries; e.g., vehicles can be given a window between 1-20 messages per second.

Across time steps, embodiments of the present invention may need to make a decision on which of the parameters (rate or power) is changed (if any). One embodiment of how to do this step is shown in FIG. 2.

At least one embodiment of the present invention provides a method for combined power and rate control/allocation in vehicular network environments that:
  a. Recognizes that cooperative awareness can be used as a metric to achieve at least one of the following goals:
    1) improved channel utilization for a given awareness rate; and/or
    2) improved cooperative awareness for a given channel utilization.
  b. Implements a two-step congestion control approach, where e. g. first the transmit power is set to achieve the awareness, after which the remaining channel resources are distributed using rate control.
  c. Uses power control to keep the cooperative awareness above a predefined threshold in various propagation environments (e.g., adjusts power to high setting in busy urban propagation environments and reduces power in open highway environment)
  d. Can use different means to adjust power for desired awareness: receiver power estimation, map information, neighborhood information, etc.
  e. By using rate control to "consume" the channel resources after the target awareness has been achieved, allows for increased rate in good propagation environments (i.e., higher rate compared to conventional methods and systems), whereas in dense environments rate may be traded for maintaining high awareness).

At least one embodiment of the present invention provides a method for combined control of the power and rate in vehicular network, which comprises the following steps:
  1) Estimating the channel characteristics by either inserting transmit power information in packets, using propagation map information, or neighborhood information.
  2) Adjusting the transmit power—at each moving object independently—to reach desired cooperative awareness.
  3) Applying a rate adaptation algorithm at each vehicle independently—to adjust the per moving object rate so that the channel load is kept within the preset limit.
  4) Repeating above steps concurrently on all moving objects.

Embodiments of the present invention may have the advantage to perform better than conventional methods and systems: For example embodiments of the present invention may increase awareness of 20% by keeping channel load within bounds and interference at almost the same level as conventional rate control methods and systems.

Further embodiments of the present invention may improve an average message rate by more than 15% by keeping the target awareness at a predefined level compared with conventional methods and systems.

Even further embodiments of the present invention can be used with different types of rate adaption procedures, for example reactive, adaptive, binary control, linear control etc., thus providing enhanced flexibility.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing communication between a plurality of moving objects, wherein one or more communication channels are used for the communication, the method comprising:
  transmitting, by each of the plurality of moving objects over the one or more communication channels, beacon messages at a fixed or variable beaconing rate; and
  performing, by each respective moving object of the plurality of moving objects independently of others of the plurality of moving objects, the following steps:
    a) determining a current neighborhood awareness ratio (NAR) for the respective moving object and, if the current NAR falls below a target NAR, adjusting a transmit power level of the beacon messages transmitted by the respective moving object such that the target NAR is achieved for the respective moving object, and
    b) determining whether a current channel load of a respective communication channel of the one or more communication channels is within a predefined load interval and, if the current channel load of the respective communication channel is not within the predefined load interval, adapting the fixed or variable beaconing rate for the respective moving object such that the channel load of the respective communication channel falls within the predefined load interval.

2. The method according to claim 1, wherein the beacon messages include information about their transmit power level, and
    wherein the information about transmit power level included in the beacon messages is used to determine whether the current channel load of the respective communication channel is within the predefined load interval in b).

3. The method according to claim 1, wherein environment communication information determined by the respective moving object is used for determining whether the current channel load of the respective communication channel is within the predefined load interval in b).

4. The method according to claim 1, wherein topological neighborhood information and/or short term channel load from neighboring moving objects are used for determining whether the current channel load of the respective communication channel is within the predefined load interval in b).

5. The method according to claim 1, wherein a) and b) are performed periodically.

6. The method according to claim 1, wherein the fixed or variable beaconing rate is computed based on at least one of: a channel busy ratio, an NAR, or a transmit rate.

7. The method according to claim 1, wherein steps a) and b) are performed for different groups of moving objects.

8. The method according to claim 1, wherein adjusting the transmit power level is performed based on path loss exponent estimation.

9. The method according to claim 1, wherein only a number and/or percentage of neighboring moving objects is considered by the respective moving object for performing steps a) and b).

10. The method according to claim 1, wherein the transmit power level is determined based on a target awareness distance.

11. The method according to claim 10, wherein the target awareness distance is determined based on a function or based on current neighbor moving objects of the respective moving object.

12. The method according to claim 1, wherein a current context in which the moving object operates is used for performing steps a) and b).

13. The method according to claim 12, wherein the context includes at least one of: a speed, a direction, or an application requirement of a moving object.

14. The method according to claim 1, wherein steps a) and b) are performed so as to adapt to propagation environments and/or application environments.

15. The method according to claim 1, wherein adjusting the transmit rate is performed using an adaptive rate control procedure.

16. A plurality of vehicles, operable to perform a method according to claim 1.

17. The method according to claim 1, wherein the NAR is a ratio of a number of vehicles within a particular communication range from which the respective vehicle receives a beacon message during a specific time period to a total number of vehicles within the particular communication range.

18. A system for managing communication between a plurality of moving objects, wherein one or more communication channels are used for the communication, the system comprising:
    the plurality of moving objects, wherein each of the plurality of moving objects is configured to:
    transmit beacon messages at a fixed or variable beaconing rate; and
    perform, independently of others of the plurality of moving objects, the following actions:
      a) determine a current neighborhood awareness ratio (NAR) for the respective moving object and, if the current NAR falls below a target NAR, adjust a transmit power level of the beacon messages transmitted by the respective moving object such that the target NAR is achieved for the respective moving object, and
      b) determine whether a current channel load of a respective communication channel of the one or more communication channels is within a predefined load interval and, if the current channel load of the respective communication channel is not within the predefined load interval, adapt the fixed or variable beaconing rate for the respective moving object such that the channel load of the respective communication channel falls within the predefined load interval.

19. A method for managing communication of a moving object, performed by the moving object, the method comprising:
    transmitting, using one or more communication channels, beacon messages at a fixed or variable beaconing rate;
    determining a current neighborhood awareness ratio (NAR) for the respective moving object and, if the current NAR falls below a target NAR, adjusting a transmit power level of the beacon messages transmitted by the respective moving object such that the target NAR is achieved for the respective moving object; and
    determining whether a current channel load of a respective communication channel of the one or more communication channels is within a predefined load interval and, if the current channel load of the respective communication channel is not within the predefined load interval, adapting the fixed or variable beaconing rate for the respective moving object such that the channel load of the respective communication channel falls within the predefined load interval.

20. A non-transitory computer readable medium storing a program causing a computer to execute a method for managing communication between the plurality of moving objects, wherein one or more communication channels are used for the communication, the method comprising;
    transmitting, by each of the plurality of moving objects over the one or more communication channels, beacon messages at a fixed or variable beaconing rate; and
    performing, by each respective moving object of the plurality of moving objects independently of others of the plurality of moving objects, the following steps:
      a) determining a current neighborhood awareness ratio (NAR) for the respective moving object and, if the current NAR falls below a target NAR, adjusting a transmit power level of the beacon messages transmitted by the respective moving object such that the target NAR is achieved for the respective moving object, and
      b) determining whether a current channel load of a respective communication channel of the one or more communication channels is within a predefined load interval and, if the current channel load of the respective communication channel is not within the predefined load interval, adapting the fixed or variable beaconing rate for the respective moving object such that the channel load of the respective communication channel falls within the predefined load interval.

21. A combined rate and power distributed congestion control (DCC) method performed by one or more vehicles, the method comprising:
- transmitting, by each of the one or more vehicles at fixed or variable beaconing rates, cooperative awareness messages (CAMs) for information of neighbor vehicles about vehicle positions and/or movements, and
- improving, by each respective vehicle of the one or more vehicles, cooperative awareness by adapting to propagation environments of a vehicle and application requirements of applications of the vehicle by performing:
  - a) determining a current neighborhood awareness ratio (NAR) for the respective vehicle and, if the current NAR falls below a target NAR, adjusting a transmit power level of the CAMs transmitted by the respective vehicle such that the target NAR is achieved for the respective vehicle, and
  - b) determining whether a current channel load of a communication channel is within a predefined load interval and, if the current channel load of the communication channel is not within the predefined load interval, adapting the fixed or variable beaconing rate for the respective vehicle such that the channel load of the communication channel falls within the predefined load interval.

22. The method of claim 21, wherein the transmit power level of the CAM messages is adjusted based on a current vehicle operating context.

23. The method of claim 22, wherein the fixed or variable beaconing rate is adapted by an adaptive rate control procedure.

24. The method of claim 23, wherein the adaptive rate control procedure is based on LIMERIC.

25. The method according to claim 21, wherein the NAR is determined based on a performance of a distributed congestion control.

26. The method according to claim 25, wherein the performance of distributed congestion control is determined by at least one of an Average Message Rate, an Average Transmit Power, and a Channel Busy Ratio (CBR).

27. A system for combined rate and power distributed congestion control (DCC), comprising:
- a plurality of vehicles, each of the plurality of vehicles comprising a transmitter configured to send cooperative awareness messages (CAMs) and a receiver configured to receive CAMs from neighbor vehicles, wherein the CAMs include information about vehicle positions and/or movements,
- wherein cooperative awareness is improved by adapting to propagation environments of a vehicle and/or application requirements of applications of the vehicle by performing, by each respective vehicle of the one or more vehicles:
  - a) determining a current neighborhood awareness ratio (NAR) for the respective vehicle and, if the current NAR falls below a target NAR, adjusting a transmit power level of the CAM messages transmitted by the respective vehicle such that the target NAR is achieved for the respective vehicle, and
  - b) determining whether a current channel load of a communication channel is within a predefined load interval and, if the current channel load of the communication channel is not within the predefined load interval, adapting the fixed or variable beaconing rate for the respective vehicle such that the channel load of the communication channel falls within the predefined load interval.

28. A non-transitory computer readable medium storing a program causing a computer to execute a combined rate and power distributed congestion control (DCC) method, performable by one or more vehicles, the method comprising:
- transmitting, by each of the one or more vehicles at fixed or variable beaconing rates, cooperative awareness messages (CAMs) for information of neighbor vehicles about vehicle positions and/or movements, and
- improving, by each respective vehicle of the one or more vehicles, cooperative awareness by adapting to propagation environments of a vehicle and application requirements of applications of the vehicle by performing:
  - a) determining a current neighborhood awareness ratio (NAR) for the respective vehicle and, if the current NAR falls below a target NAR, adjusting a transmit power level of the CAMs transmitted by the respective vehicle such that the target NAR is achieved for the respective vehicle, and
  - b) determining whether a current channel load of a communication channel is within a predefined load interval and, if the current channel load of the communication channel is not within the predefined load interval, adapting the fixed or variable beaconing rate for the respective vehicle such that the channel load of the communication channel falls within the predefined load interval.

* * * * *